United States Patent [19]

Hayashi et al.

[11] Patent Number: 4,726,968

[45] Date of Patent: Feb. 23, 1988

[54] PROCESS FOR IMPROVING POLYMER SUBSTRATE PROPERTIES, AND MODIFIED POLYMERS PRODUCED THEREBY

[75] Inventors: Katsumi Hayashi, Mentor; Gregory A. Lentz, Twinsburg, both of Ohio

[73] Assignee: Intera Company, Ltd., a Tennessee Limited Partnership, Cleveland, Tenn.

[21] Appl. No.: 788,059

[22] Filed: Oct. 16, 1985

[51] Int. Cl.[4] .......................... B05D 1/18; B05D 3/02; B05D 3/04; B32B 7/00

[52] U.S. Cl. ..................................... 427/342; 427/386; 427/389.9; 427/430.1; 428/264; 428/265; 428/267; 428/270

[58] Field of Search ................. 427/386, 389.9, 393.4, 427/393.5, 342, 430.1; 428/264, 265, 267, 270

[56] References Cited

U.S. PATENT DOCUMENTS

| | | | |
|---|---|---|---|
| 3,652,212 | 3/1972 | Machell | 427/393.4 X |
| 4,065,256 | 12/1977 | Igeta et al. | 8/115.7 |
| 4,081,383 | 5/1978 | Warburtan et al. | 427/386 X |
| 4,242,408 | 10/1980 | Evani et al. | 427/389 X |
| 4,448,839 | 5/1984 | Morris | 427/393.4 X |

Primary Examiner—Michael R. Lusignan
Attorney, Agent, or Firm—Oblon, Fisher, Spivak, McClelland & Maier

[57] ABSTRACT

A process for improving the hygroscopic, soil release and other properties of a polymer substrate is provided in which the substrate is contacted with a suitable aqueous mixture containing a water-soluble cross-linking vinyl monomer and an organic hydrophobic carrier compound at a temperature of between about 40° C. to 100° C. Polymerization of the monomer is thereafter initiated by a chemical or physical initiator to form a vinyl polymer evenly disposed on the substrate. The hygroscopic, soil release and other surface properties of the substrate are thereby improved. The mixture may be in the form of an emulsion wherein the hydrophobic carrier compound is emulsified by an appropriate agent. The invention also pertains to the improved substrates prepared in accordance with the present process.

46 Claims, No Drawings

4,726,968

PROCESS FOR IMPROVING POLYMER SUBSTRATE PROPERTIES, AND MODIFIED POLYMERS PRODUCED THEREBY

CROSS-REFERENCE TO RELATED APPLICATION

This application is related to the commonly assigned co-pending patent application Ser. No. 663,103, filed Oct. 22, 1984, which is a continuation-in-part of patent application Ser. No. 585,312 filed Mar. 1, 1984, now abandoned. The disclosure of applications Ser. No. 663,103 and 585,312 are incorporated herein by reference.

FIELD OF THE INVENTION

The present invention relates to the treatment of polymer substrates to increase hydrophilicity in order to permanently and substantially improve the hygroscopic, antistatic, dye-receptive, water-wetting, soil release and/or other surface properties, as well as to alter water permeability and hand wherein the substrate is a fabric.

BACKGROUND OF THE INVENTION

Synthetic polymer materials possess poor surface properties. Most fibers formed from synthetic polymers are not hygroscopic and have poor antistatic and soil release properties. In particular, many conventional fabrics formed from polyester and polypropylene have relatively poor hand properties. They have a slick or synthetic fabric feel. They are deficient in properties relating to hydrophilicity, in particular hygroscopic, antistatic, and soil release properties.

The prior art approaches for depositing a water soluble vinyl monomer onto a polymeric substrate may be grouped into two general categories (I) formation of a hydrophilic polymer on the surface of and within the substrate by adhesion and/or entanglement of the polymer and the substrate; (II) chemical modification of the substrate by graft polymerizing a hydrophilic monomer onto the substrate.

Examples of the first approach include U.S. Pat. Nos. 3,377,249 and 3,958,932. The method of U.S. Pat. No. 3,377,249 employs an aminoplast textile resin to effect adhesion of a synthetic acid emulsion polymer to a polymeric substrate. In the method of U.S. Pat. No. 3,958,932 the vinyl polymer is affixed to the polymeric substrate by the use of elevated temperature curing.

In U.S. Pat. No. 3,926,551 water-insoluble polymers derived from acidic vinyl monomers are formed both on the surface and within polyester fibers. In U.S. Pat. No. 3,995,998 polymers derived from both acidic and non-acidic water soluble vinyl monomers are deposited on both the surface and within the fibers forming the polymer substrate. In U.S. Pat. No. 4,238,193, an impregnated initiator is used to penetrate into the interior of a polymeric substrate fiber and to effect polymerization of a water soluble vinyl polymer both onto the surface of and within the substrate.

The second approach has been to chemically modify the polymeric substrate so as to receive the polymer from a water soluble vinyl graft polymerization. U.S. Pat. Nos. 3,088,791; 3,107,206; 3,115,418; and 3,617,457 each disclose the use of high energy radiation to modify a polymeric substrate. It is believed that the high energy radiation cleaves the bonds on the surface of a polymer to form free radicals. These free radicals participate in chemical reactions with the vinyl monomer. U.S. Pat. No. 3,088,791 irradiates a shaped organic polymer substrate at low temperatures. U.S. Pat. No. 3,107,206 irradiates a stem polymer that has been swollen with a non-polymerizable swelling agent. U.S Pat. No. 3,115,418 irradiates a polymeric substrate in the presence of oxygen. U.S. Pat. No. 3,617,457 describes irradiation of a polyester substrate and uses unique water soluble vinyl monomers.

U.S. Pat. No. 3,600,122 employs a spark discharge in a zone of free radical initiating gas to generate free radical sites on the surface of a polymeric substrate. This modified polymeric substrate is further reacted like any irradiated polymer.

U.S. Pat. No. 4,043,753 modifies a conventional polyester substrate by incorporating p-carboxycinnamic acid to replace a portion of a terephthalic acid of the polyester. The resultant polymeric substrate is a modified polyester polymer containing an unsaturated group that is susceptable to graft polymerization.

In U.S. Pat. No. 4,065,256 a composition comprising a liquid organic solvent, and a hydrophobic radical polymerization initiator is used to achieve graft polymerization onto both the surface and within a hydrophobic synthetic polymer substrate.

The above prior art approaches frequently suffer from undue expense, complex equipment requirements, and other processing shortcomings. These approaches generally can not yield a substrate having the surface properties which we desire that will substantially withstand repeated launderings such as 20 or more launderings in a conventional washing machine.

SUMMARY OF THE INVENTION

According to the present invention, a polymer substrate is contacted with an aqueous mixture at a temperature between about 40° C. and about 100° C. containing a water-soluble cross-linking vinyl monomer and an organic hydrophobic carrier compound, all nonaromatic carbon-carbon bonds of the carrier compound being saturated. The aqueous mixture is maintained at a temperature within the range of about 40° C. to about 100° C., preferably under agitation. Thereafter, vinyl polymerization of the water soluble vinyl monomer is initiated to form a vinyl polymer on the substrate whereby the hygroscopic, antistatic, dye-receptive, soil release and other surface properties of the substrate are improved.

The aqueous mixture may be in the form of an emulsion containing the water-soluble cross-linking vinyl monomer and the carrier compound emulsified by a suitable emulsifying agent, namely a surfactant. For carrier compounds which are self-emulsifying under the conditions employed, an emulsifying agent is not necessary. The emulsifying agent, if present, is in an amount sufficient to maintain a suitable aqueous emulsion but not enough to adversely interfere with the process. Thereafter, a polymerization initiator and an acid may be added. Polymerization and affixation of the polymer to the substrate is achieved, usually by means of elevating the temperature to a temperature in which such polymerization occurs, and/or the addition of an initiator.

The resultant polymeric substrate possesses desirable hygroscopic, soil release and/or other surface properties which persist after repeated launderings in a conventional washing machine, namely in excess of 20 cycles of home laundering.

DETAILED DESCRIPTION OF THE INVENTION

By "aqueous mixture" as used herein is meant any aqueous solution, dispersion, suspension, colloidal solution, emulsion or other aqueous physical aggregation containing a water-soluble cross-linking vinyl monomer and a hydrophobic carrier compound. The present invention contemplates not only forming an emulsion of the carrier compound, but also contemplates introducing the carrier into the aqueous medium by any other means, such as by dissolving it in an appropriate solvent to aid formation of a physical dispersion.

By "substrate" as used herein is meant a polymeric material which is preferably in the form of fibers or fabrics, but may also be in the form of flakes, films, microporous films, membranes, resins, foams, sheets, powders or suitably shaped formed articles. Suitable polymeric materials include polyesters, polyacrylates, polyamides, polyurethanes, polystyrenes, polyolefins, polycyanoethylenes or polyacrylonitriles, halogenated polymers, such as polytetrafluoroethylene, poly(vinyl chloride) and the like, synthetic or natural elastomers, polycarbonates and the like. In addition to traditional polymers naturally occurring materials such as silk, wool, cotton or the like may also be processed in accordance with this technique.

By "fiber" is meant to include monofilaments, multifilament threads, batts and staple fibers.

By "fabrics" is meant to include woven fabrics, knitted fabrics, and nonwoven fabrics.

By "hydrophobic carrier compound" is meant a hydrophobic molecule which has a greater affinity for the substrate than for the surrounding aqueous medium under the conditions of the present invention, and which when employed in the present process, yields a substrate having more durable improved surface properties. Such compounds are limited to those organic compounds wherein all non-aromatic carbon-carbon bonds are saturated. Thus, excluded from use as carrier compounds are molecules containing the vinyl group ($CH_2=CH-$), as exemplified by ethyleneglycol dimethacrylate, ethoxylated bisphenol A dimethacrylate, allyl acrylate, and other such highly reactive, easily polymerizable monomers which contain at least one vinyl group.

By "vinyl polymer" as used herein is meant to include homopolymers resulting from the vinyl polymerization of the water-soluble cross-linking vinyl monomers, and copolymers thereof.

By "cross-linking" vinyl monomer is meant a vinyl monomer having at least two vinyl functional groups.

By "vinyl polymerization" is meant polymerization in which a vinyl group in a monomer participates in the formation of a polymer.

Wherever the present disclosure refers to fiber surfaces or intimate contact of the monomer with fiber surfaces or like expressions, it will be understood that the individual fibers or filaments are being referred to, such that contact and attachment of the monomer and polymer is with the surfaces of individual filaments of a multifilament thread or bundle.

Polyester is the generic name for a fiber manufactured either as a staple fiber or continuous filament in which the fiber-forming substance is any long chain synthetic polymer composed of at least 85% by weight of an ester of a dihydric alcohol and terephthalic acid. The most common polyester fibers available in the United States are made of polyethylene terephthalate, and are available for example under the trademarks "DACRON" of E. I. duPont de Nemours & Co., "KODEL" of Eastman Chemical Products, Inc. and "FORTREL" of ICI United States, Inc., and from Celanese Chemical Co. Polyester fibers are available as filament yarn, staple fibers and fiber tows and are often combined with other fibers, such as cotton and wool. For example, much clothing is made from yarns which are a blend of polyester and cotton staple fibers. Fabrics made from such polyester fibers and fiber combinations are commonly used for making many types of outerwear, including dresses, suits, shirts, etc. Such blends may be used as the substrates of this invention.

Polyesters form excellent fabrics and can be produced economically on a mass production basis, but polyesters suffer from many drawbacks. Polyesters lack the ability to significantly absorb water and are subject to static electricity problems. By treating polyester fibers according to the process of the present invention, a most useful fabric is formed which has very good water absorbance and soil-release properties which are substantially retained after many washings.

Polyolefin is the name for a group of polymers derived from simple olefins. These materials may be suitably employed as substrates according to the present invention. Non-limiting examples include polyethylene, polypropylene, poly-1-butene and other poly-1-olefins, and copolymers thereof. The preferred polyolefin for use in the present invention is polypropylene.

Polypropylene is a long chain synthetic polymer composed of at least 85 weight percent of polymerized propylene. Polypropylene has a low specific gravity which causes it to be bulkier for any given denier than polyester. As heretofore noted, polypropylene possesses a distinctive hand. Polypropylene can be blended with wool and other fibers, and is used as fabrics, cordage, sewing thread, upholstery strapping, wrapping for cotton bales, nursery shade cloths, disposable products such as diapers and sanitary napkins, medical products such as uniforms, sheets and drapes, filtration products such as tea bags and coffee filters, carpeting, laundry bags, synthetic turf, reinforcement material for civil engineering uses, backing fabrics, etc. Such blends may be used as the substrates of our invention.

Polyamides are high molecular weight polymers in which amide linkages (CONH) occur along the molecule chain. Preferred polyamides for use in the present invention are the synthetic linear condensation polyamides. Such polyamides include for example poly(hexamethylene adipamide), which is prepared by the well known reaction of polycarboxylic acid such as adipic acid (or an amide-forming derivative thereof) with a polyamine such as hexamethylene diamine. The most common commercially available polyamides of this type in the United States are nylon 6,6 which is poly(hexamethylene adipamide), and nylon 6 which is poly-caprolactam. These types of nylons are commonly extruded as filaments over a wide dimensional range, oriented by cold-drawing and knitted into many different forms of fabrics. Nylons are excellent fabrics and can be produced economically on a mass production basis, but they suffer from many drawbacks. Nylons lack the ability to absorb water and they are subject to static electricity problems. By treating nylon according to the process of the present invention, the most useful fabric may be formed which has very good water-absorbing, antistatic, and soil release properties which are retained after many washings.

Acrylic is the generic name for fibers in which the fiber-forming substance is any long chain synthetic polymer composed of at least 85% by weight of acrylonitrile units (—CH$_2$CH(CN)—). Such fibers are available in various types of staple fibers and tow, and are commerically available under the trademarks "ORLON" of E. I. duPont Nemours & Co. and "CRESLAN" of American Cyanamid Co., for example. Acrylic fibers for wearing apparel may be blended with other fibers, such as wool, or may be formed into yarns which are then knitted with other stronger synthetic fibers or filaments, such as nylon. Such blends may be used as substrates of our invention.

Most acrylics lack the ability to significantly absorb water and are subject to static. By treating acrylic fibers according to the process of the present invention, fabrics may be obtained which have excellent water-absorbing, antistatic and soil release properties which are retained after many washings.

Polyurethanes may suitably serve as substrate materials for the present invention. Polyurethane is the generic name for thermoplastic as well as thermosetting polymers, produced by the condensation reaction of a polyisocyanate and a hydroxyl-containing material, e.g., a polyol derived from propylene oxide or trichlorobutylene oxide. Polyurethane fibers are used chiefly in the socalled spandex fibers for girdles and other textile structures requiring exceptional elasticity. Such fibers are typically manufactured by the reaction of 4,4'-methylenedi(phenyl isocyanate) and poly(tetramethylene oxide) macroglycol followed by a chain extension reaction. Elastomers of polyurethane useful as films, linings and other practical items are derived from the reaction of polyisocyanates with linear polyesters or polyethers containing hydroxyl groups. Polyurethane foams for furniture, mattresses, seat cushions and the like are formed from the treatment of a polyether macroglycol such as poly(ethylene oxide-CO-propylene oxide), with a diisocyanate in the presence of water and a catalyst.

A variety of halogenated hydrocarbon polymers may serve as substrates for the present process including polyvinyls such as poly(vinyl chloride) and poly(vinyl fluoride), the latter sold under the trademark "TEDLAR" by DuPont Company; polyvinylidenes such as poly(vinylidene chloride) (popularly known as "SARAN") and poly(vinylidene fluoride); copolymers of poly(vinylidene chloride) or poly(vinylidene fluoride) such as the "VITON" trademarked materials which comprise a series of fluoroelastomers sold by DuPont Company based on the copolymerization of vinylidene fluoride and hexafluoropropylene; and fluorocarbon polymers including but not limited to polytetrafluoroethylene, sold by DuPont Company under the trademark "TEFLON". Other halogenated hydrocarbon polymers are known to those skilled in the art.

A wide variety of articles may be prepared from substrates treated according to the present invention. In addition to the articles discussed above, non-limiting examples of useful articles include the following: clothing, sheeting and bedding; diapers; incontinent appliances; surgical sponges and dressings; hospital wipes; surgical kraft paper; battery separators; filters, chromatographic resins and other chronotographic substrates; ultra-thin membrane resistors; and floor and wall coverings.

Filter media, battery separators, ultra-filtration media and the like which must allow the transfer of aqueous media are particularly appropriate substrates for treatment. Quite often it would be desirable to fabricate these materials from hydrophobic polymers such as polystyrenes, polyurethanes, halogenated polymers and the like. However, because of the surface tension created by the hydrophobic surface, the pressure drop across the filter or separator may be unacceptably high. By treating such media in accordance with this invention it is possible to reduce this surface tension effect.

Non-limiting examples of suitable water-soluble crosslinking vinyl monomers that may be used in this invention include 2,2-bisacrylamidoacetic acid, and esters and salts thereof; 1,1-bisacrylamido-2-methylpropane-2-sulfonic acid and esters and salts thereof; N,N'-methylenebisacrylamide, better known by its acronym "MBA"; N,N'-(1,2-dihydroxyethylene)bisacrylamide; and diethylene glycol diacrylate. In some instances, one or more water soluble mono-vinyl monomers may be copolymerized with one or more water soluble crosslinking vinyl monomers to form the surface polymer according to the present invention. Non-limiting examples of suitable water-soluble monovinyl monomers include acrylamide; acrylic acid; 2-propyn-1-ol; crotonic acid; vinylpyridines; methacrylic acid; 2-acrylamido-2-methylpropanesulfonic acid; methacrylamide; N-methylolacrylamide; N-methyl-N-vinylformamide; N-vinylpyrrolidone; 3-, 4-, or 5-methyl-N-vinylpyrrolidone; maleic acid; vinyloxyethylformamide; acrylonitrile; methacrylonitrile; methallyl alcohol; and styrenesulfonic acid, and water soluble salts thereof. The mono-vinyl monomers may be utilized to improve the surface properties of the treated substrate. When only a cross-linking monomer is utilized, the resulting product may have a brittle or hard feel or hand. Incorporation of a mono-vinyl compound may further improve the permanency of the treatment by reducing the brittleness of the cross-linked polymer. The use of a functional mono-vinyl monomer may also provide additional dye receptivity to the treated substrate. The amount of mono-vinyl monomer utilized is that sufficient to provide the desired feel or hand while retaining the desired properties imparted by the treatment. Where hand or feel is not important, no mono-vinyl monomer need be utilized. The preferred water soluble cross-linking vinyl monomers are N,N'-methylenebisacrylamide, 2,2-bisacrylamidoacetic acid and N,N'-(1,2-dihydroxyethylene)bisacrylamide.

The organic hydrophobic compounds suitable as carriers in the present process may be selected from the following non-limiting categories (1) through (VII) in which n is an integer from 0 to 10 inclusive, it being understood that all non-aromatic carbon-carbon double bonds are saturated:

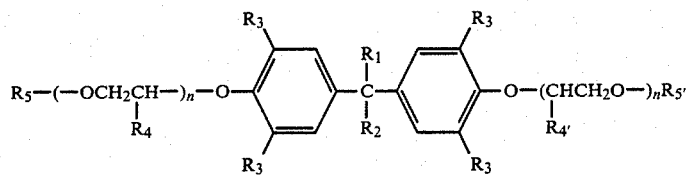

(I)

wherein
- $R_1$, $R_2$ are independently hydrogen or alkyl, cycloalkyl, alkylaryl, or halohydrocarbyl groups of from one to twenty carbon atoms;
- each $R_3$ is independently hydrogen or alkyl;
- $R_4$, $R_{4'}$ are independently hydrogen or hydrocarbyl groups of from one to twenty carbon atoms; and
- $R_5$, $R_{5'}$ are independently hydrogen, hydrocarbyl or halohydrocarbyl groups of from one to thirty carbon atoms, or acyl groups of from one to thirty carbon atoms.

Non-limiting examples of substituents according to Formula I include the following: $R_1$=ethyl or methyl; $R_2$=ethyl or methyl; $R_3$=hydrogen, or acyl grouos such as formyl, acetyl, propionyl, butanoyl, isobutanoyl, caproyl and undecanoyl, or alkyl groups such as methyl, ethyl, propyl, butyl and octyl. Preferred compounds according to Formula I include 4,4'-isopropylidenediphenol, better known by its trivial name Bisphenol A; the mono and diethoxylated analogs of Bisphenol A, respectively, 4,4'-isopropylidenebis[2-(2-hydroxyethoxy)benzene]and 4,4'-isopropylidenebis[2(2-hydroxyethoxy)ethoxybenzene]; the mono and diethoxylated analogs of Bisphenol A diisobutyrate, respectively, p,p'-isopropylidenebis(2-phenoxyethyl isobutyrate); p,p'-isopropylidenebis(2-phenoxyethoxyethyl isobutyrate); and p,p'isopropylidenebis(2-phenoxy-1-methylethyl isobutyrate); 4,4'-isopropylidenebis[3,5-dichloro-4-(2-acetoxyethoxy) benzene]; ethylene oxide; propylene oxide; 4,4'-butylidenebisphenol, better known by its trivial name Bisphenol B.

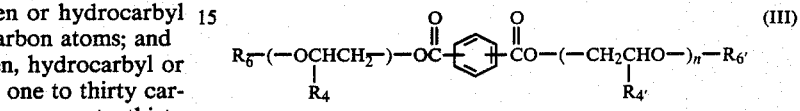

(II)

wherein
- $R_4$, $R_{4'}$, are as defined above; and
- $R_6$, $R_{6'}$ are independently (i) hydrogen, (ii) alkyl, cycloalkyl, alkylaryl, or halohydrocarbyl groups of from one to twenty carbon atoms, or (iii) alkanoyl, cycloalkanoyl, alkanoylaryl or halohydrocarbanoyl groups of from one to twenty carbon atoms.

Non-limiting examples of suitable hydrophobic carrier compounds according to Formula II include the following para-substituted compounds and meta analogues thereof: p-di(3-hydroxy-1-oxapropyl)benzene; p-di(3-hydroxy-2-methyl-1-oxapropyl)benzene; p-di(6-hydroxy-1,4-dioxahexyl)benzene; p-di(6-hydroxy-2,5-dimethyl-1,4-dioxahexyl)benzene; p-di(3-isobutanoyloxy-1-oxapropyl)benzene; p-di(6-isobutanoyloxy-1,4-dioxahexyl)benzene; p-di(3-acetoxy-1-oxapropyl)benzene; p-di(3-methoxy-1-oxapropyl)benzene; p-di(6-n-butoxy-1,4-dioxahexyl)benzene;

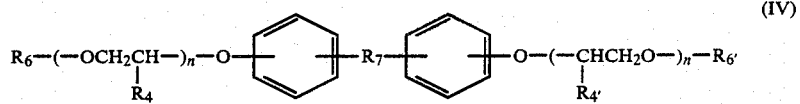

(III)

wherein $R_4$, $R_{4'}$, $R_6$ and $R_{6'}$ are as defined above,

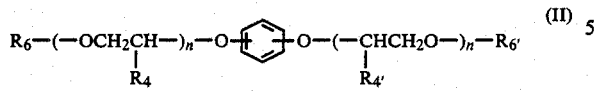

(IV)

wherein $R_4$, $R_{4'}$, $R_6$ and $R_{6'}$ are as defined above; and $R_7$ is an alkylene group of from one to twenty carbon atoms; an alkyl-, cycloalkyl-, aryl-, aralkyl-, halo- or haloalkyl-substituted alkylene group of from one to twenty carbon atoms; or oxygen, sulfur, C=O or —SO$_2$.

Non-limiting examples of suitable alkylene or substituted alkylene groups as $R_7$ include the following:

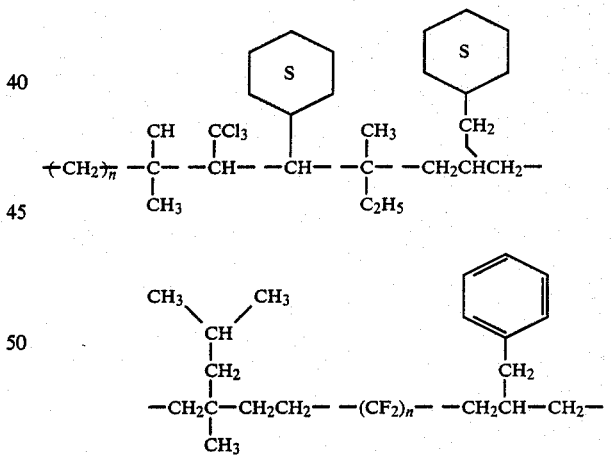

Non-limiting examples of suitable hydrophobic carrier compounds according to Formula IV include the following: 4,4'-isopropylidenebis[(3-hydroxy-1-oxapropyl)benzene]; 4.4'-isopropylidenebis[6-hydroxy-1,4-dioxahexyl)benzene]; 4,4'-isopropylidenebis[(9-hydroxy-1,4,7-trioxanonyl)benzene]; 4-4'-isopropylidenebis[(3-hydroxy-2-methyl-1oxapropyl)benzene]; 4,4'-isopropylidenebis[(6-hydroxy-2,5-dimethyl-1,4-dioxahexyl)benzene]; 4,4'-isopropylidenebis[(9-hydroxy-2,5,8-trimethyl-1,4,7trioxanonyl)benzene]; 4,4'-isopropylidenebis[(6-acetoxy-1,4-dioxahexyl)benzene];4,4'-isopropylidenebis[(9-acetoxy-2,5,8-trioxanonyl)benzene]; 4,4'-isopropylidenebis[(6- isobutanoyloxy-1,4,-dioxahexyl)-benzene]; 4,4'-isopropylidenebis[(9-isobutanoyloxy-1,4,7-trioxanonyl)-benzene]; 4,4'-butylidenebis[(6-hydroxy-1,4-dioxahexyl)benzene]; 4,4-oxobis[(6-hydroxy-1,4-dioxahexyl)-benzene].

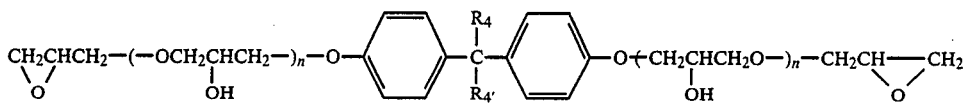

(V)

wherein $R_4$ and $R_{4'}$ are defined as above.

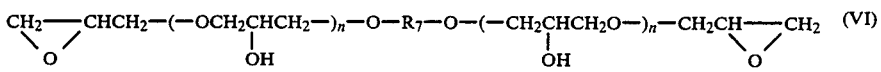

(VI)

wherein $R_7$ is defined as above.

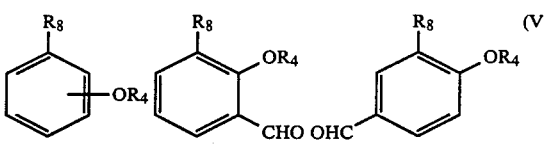

(VII)

wherein
$R_4$ is defined as above; and
$R_8$ is hydrogen, or an alkyl, cycloakyl, alkylaryl or halohydrocarbyl group of from one to thirty carbon atoms.

Non-limiting examples of suitable hydrophobic carrier compounds according to Formula VII include the following: p-nonylphenyl 2-hydroxyethyl ether; o-nonylphenyl 2-hydroxyethyl ether; p-dodecylohenyl 5-hydroxy-3-oxapentyl ether; o-dodecylphenyl 5-hydroxy-3-oxapentyl ether; p-nonylphenyl 5-isobutanoyloxy-3-oxapentyl ether; 2-(3-hydroxyl-1-oxapropyl)-5-dodecylbenzaldehyde; 2-(6-isobutanoyloxy-1,4-dioxahexyl)-5-heptylbenzaldehyde; 3-nonyl-4-(6-hydroxy-1,4-dioxahexyl)benzaldehyde.

The hydrophobic carrier compounds are preferably emulsifiable. A plurality of such carrier compounds may be used.

We have found surprisingly that the hydrophobic carrier compound need not contain the vinyl function. Illustrative non-vinyl hydrophobic molecules particularly effective as carrier compounds in the present process include non-polymerizable molecules such as di-, tri- and higher ethoxylated Bisphenol A. Also particularly effective is ethoxylated Bisphenol A diisobutyrate. Illustrative polymerizable non-vinyl hydrophobic compounds include 1,4-butanediol diglycidyl ether and epoxy resins such as the resin "D.E.R. 331" available from Dow Chemical Company:

the naked eye. Normally, in accordance with the present invention, the initial emulsion may be milky in appearance. This milky appearance may be clarified somewhat or clarified completely as the carrier compound is withdrawn from the emulsion to the substrate.

In the absence of the contact of carrier compound with the substrate, the polymer derived from the water-soluble vinyl monomer is relatively loosely affixed to the substrate and most of the improved properties attributable to this polymer are rapidly lost during washing. This is especially true for hydrophobic substances such as polypropylene, polyester and poly(vinyl chloride).

Polymers prepared from polymerizable hydrophobic carrier compounds alone do not have the desirable surface properties achieved by the polymers of the present invention. Moreover, we have found that non-polymerizable compounds such as ethoxylated Bisphenol A diisobutyrate are effective as hydrophobic carriers.

For self-emulsifying carrier compounds, it may not be necessary to first form an emulsion thereof prior to contacting the substrate. However, in the case where an emulsifier is utilized, an appropriate concentration of emulsifying agent or surfactant should be used. If the concentration is too low, there will not be a suitable emulsion and there will not be even intimate contact between the hydrophobic carrier and the substrate. It is preferred to eliminate the deposition of globs of visible particles of carrier.

There is preferably a period of time prior to the polymerization reaction when the aqueous mixture is dispersed adjacent to the substrate so that adequate contact between the carrier and the substrate is achieved. This period of time can vary greatly, and is normally between about 30 seconds to as much as about 30 minutes.

The basic structure of a surfactant contains two distinct elements, the hydrophobic and hydrophilic portions. Hydrocarbons containing chains of 8 to 20 carbon atoms offer suitable hydrophobes. Hydrophobes can include aliphatic compounds, that are either saturated or unsaturated and/or aromatic compounds. Hydrophobes can also contain oxygen or halogen atoms. Among commonly used hydrophobes are long straight

Prior to the polymerization of the water-soluble cross-linking vinyl monomer, the aqueous mixture is contacted with the substrate. Preferably, a suitable emulsion of the carrier compound and the vinyl monomer should be formed, with such emulsion contacting the substrate. By suitable emulsion as used herein is meant an emulsion in which no droplets are visible to chain alkyl groups, long branched chain alkyl groups, long chain alkylbenzenes, alkylnaphthalenes, rosin and lignin derivatives, high molecular weight propylene oxide polymers, long chain perfluoroalkyl groups, polysiloxane groups, and perfluorinated compounds. Common sources of hydrophobes would include tallow, coconut oil, vegetable oils, red oil, castor oil, olive oil, peanut oil, tall oil, cotton seed oil, safflower oil, mineral oil, alkylbenzenes, diphenyl oxide, naphthalene formaldehyde condensates and lignin.

Among commonly used hydrophilic groups are the anionic, cationic, nonionic and amphoteric. The anionic groups would include carboxylate, sulfate, sulfonate, and phosphate esters. The cationic groups would include salts of primary amines, salts of secondary amines, salts of tertiary amines and quaternary ammonium compounds. The nonionic groups would include ethylene oxide adducts or other hydrophilic polymers that carry no electrical charge. The amphoteric groups would include surfactants that contain both acidic and basic hydrophilic groups that would function either as anionic or cationic depending on the pH of the solution.

A wide variety of surfactants can be used in the present invention. Examples include anionic surfactants such as alkyl sulfonate, alkyl sulfate, sulfated oil or fat, sulfated glycol ester, sulfated alkanolamide, sulfated alkylphenol polyglycol, sodium xylenesulfonate, sodium dibutylnaphthalenesulfonate, sodium dodecylbenzenesulfonate, sodium sulfonate of naphthalene formaldehyde Condensate, sulfonated amide, monoalkyl phosphate salt, dialkyl phosphate salt, trialkyl phosphate, neutralized carboxylic acids (i.e. sodium stearate) and sulfated ethers.

Suitable surfactants also include amphoteric examples such as alkylglycine, N-alkylbetaine, imidazoline, glycine, sulfated polyglycol amine, and alkylamine sulfonate. Further suitable surfactants include cationic examples such as quaternary ammonium compounds, fatty amine salts, alkylamine polyoxyethanol glycols, (fatty alkyl)dimethylbenzylammonium chloride, laurylpyridinium chloride, N-acyl-N'-hydroxyethylethylene diamine, N-alkyl-N'-hydroxyethylimidazoline and amino amides. Nonionic surfactants may also be used. Suitable examples include ethoxylated fatty alcohols, ethoxylated long branched chain alcohols, and ethoxylated alkylaryl alcohols, and ethoxylated fatty amines. Other suitable nonionic surfactants include polyethylene glycol esters and polyethylene glycol amides.

The choice of surfactant and the amount of surfactant would be limited to those that do not significantly interfere with the polymerization reaction and interaction between the water-soluble cross-linking vinyl monomer, the hydrophobic carrier compound and the substrate. The preferred surfactants are the anionic and the nonionic surfactants. It has been found that some of the cationic (i.e. primary, secondary and tertiary amines) may interfere with the present invention under some reaction conditions. The determination of whether a given surfactant or the amount of a surfactant significantly interferes with polymerization may be accomplished by routine preliminary testing within the skill of one of ordinary skill in the art.

The choice of the polymerization initiator would depend on the type of water-soluble monomer and hydrophobic carrier compound, on the temperature of polymerization and on other parameters.

A physical impetus may be used to polymerize the water-soluble monomer. Examples of physical impetus include photochemical initiators, such as ultraviolet radiation, or ionizing radiation, such as gamma rays and fast electrons. By the term "initiator" we mean any chemical or physical impetus or combination thereof that will start and maintain a vinyl polymerization of the monomer.

Non-limiting examples of polymerization initiators that may be utilized in this invention include inorganic peroxides, e.g., hydrogen peroxide, barium peroxide, magnesium peroxide, etc., and various organic peroxy compounds, illustrative examples of which are the dialkyl peroxides, e.g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g. tert.-butyl hydrogen peroxide (tert.-butyl hydroperoxide), tert.-amyl hydrogen peroxide (tert.-amyl hydroperoxide), etc., diacyl peroxides, such as acetyl peroxide, propionyl peroxide, lauroyl peroxide, stearoyl peroxide, malonyl peroxide, succinyl peroxide, phthaloyl peroxide, benzoyl peroxide, etc., fatty oil acid peroxides, e.g., coconut oil peroxides, etc., unsymmetrical or mixed diacyl peroxides, e.g., acetyl benzoyl peroxide, propionyl benzoyl peroxide, etc., terpene oxides, e.g., ascaridole, etc., and salts of inorganic peracids, e.g., ammonium persulfate and potassium persulfate.

Initiators also include ceric ions, for example, in the form of ceric salts such as ceric nitrate, ceric sulfate, ceric ammonium nitrate, ceric ammonium sulfate, ceric ammonium pyrophosphate, ceric iodate, and the like. Non-limiting examples of suitable acids for use in the present invention include hydrochloric, phosphoric, sulfuric, nitric, acetic, formic, oxalic, tartaric, monochloroacetic, dichloroacetic, trichloroacetic and similar acids.

The polymerization should preferably occur at an appropriate hydronium ion concentration. The acids listed above, namely hydrochloric, phosphoric, sulfuric, nitric, acetic, formic, oxalic, tartaric, monochloroacetic, dichloroacetic, trichloroacetic and similar acids may function as a reagent to control the hydronium ion concentration or pH. In addition, bases such as potassium hydroxide and sodium hydroxide may be required to control pH. The pH may range during polymerization from about 1 to about 13, preferably from about 2.5 to about 12.5, and most preferably from about 2.5 to about 4.0.

The time duration for the polymerization of the water soluble vinyl polymer following initiation should be between about 30 seconds and 30 minutes. Generally, the time duration is not critical, but the time should be sufficient for the polymerization to take place to the desired extent. While the process of the present invention may be used at any of a number of stages during the usual processing of polymer fibers or fabrics, or other substrates, it has been found preferable to use the process before the dyeing of the fibers or before there is any treatment of the fibers which would result in encapsulation or coating of the fiber surface. It is common practice to encapsulate or "lock on" the dye or other fiber treatment chemicals, and such coating may often interfere with the present process. To the extent that there would still be improvement in surface properties, the improvement would be gradually washed off through repeated washings.

It is preferable that the fibers be scoured and rinsed prior to carrying out the treatment process of the present invention in order to remove soil, finish oils, and other contaminants which may be present on the fibers. After the process of the present invention, it is preferable to drain the treating solution and rinse the fibers before dyeing, in order to remove acid and excess homopolymer and unreacted components, which may interfere with reaction of the dye with the dye sites.

Uniform dispersal and intimate contact of all chemicals during the process of the present invention is preferred. In the case of fibers this may be assisted by various forms of agitation or flow of the aqueous treating mixture around and between the fiber surfaces. For example, in the case of the treatment of fibers in the form of fabric piece goods, agitation may be accomplished by the paddles in a conventional paddle tub. Alternatively, for fibers in the form of fabrics which are processed in the form of rolls on a beam, the aqueous treating solution may be circulated around and through the beam by conventional pressure means.

The time necessary for attaining uniform dispersal, intimate contact and attachment onto the substrate will vary with the particular method of contacting the substrate with the aqueous mixture, and may range from one second to thirty minutes. Although it is possible that the aqueous mixture could be contacted with the fibers by spraying, paddling, dipping or other means, it is most preferable to immerse the fibers in a bath formed by the mixture. Using such immersion techniques, relatively short periods of time are necessary before polymerization may begin. For example, about 10 minutes is usually sufficient with adequate agitation or circulation of the aqueous mixture.

The process can be controlled by restricting any one or more of the controlling factors of heat, time, initiator, pH, or by restricting addition of the watersoluble cross-linking vinyl monomer and/or hydrophobic carrier compound. Thus, by way of example and not by way of limitation, the monomer, carrier, acid, and substrate may be placed in an aqueous medium with agitation, with the aqueous medium being brought up to the appropriate temperature. The polymerization process can then be triggered by the addition of the initiator.

An alternative example would be to assemble the water soluble monomer, carrier, acid, initiators and substrate in an aqueous medium and maintain the same at a temperature below the polymerization temperature. The polymerization process could then be triggered by raising the temperature. The substrate after being cleaned is immersed in the aqueous mixture. The temperature is non-critical as long as a threshhold temperature sufficient to effect polymerization with the components at the concentration of the components is achieved. Generally, a temperature range between about 40° C. and about 100° C. is suitable. The temperature range from about 80° C. to about 100° C. is preferred, with about 90° C. to about 95° C. being most preferred. At a temperature within the range of 90° C. to 95° C., lower concentrations of components can be used, particularly the preferred initiator, potassium persulfate. Some of the initiators, such as potassium persulfate under the conditions used, will not readily initiate a vinyl polymerization at a temperature as low as 40° C. However, other initiators will initiate vinyl polymerization at a temperature of as low as 40° C. and perhaps even lower. In most cases, the threshhold temperature is dependent upon the components, their concentration, pH and particularly the nature of the initiator.

In a preferred embodiment, the substrate is first immersed within the water after being cleaned. The water may be at ambient temperature, or may be heated as to within the range of about 40° C. to 100° C. Thereafter, the hydrophobic carrier compound and the emulsifying agent are added to the water. A suitable weight percentage range for the hydrophobic carrier compound is normally between about 0.02 to 2.0 weight percent on weight of substrate and a suitable weight percentage range for the emulsifying agent is any weight percentage range that achieves an emulsion that remains suitable throughout the process of the present invention, as "suitable" has been heretofore defined. The upper and lower limits of concentration for the hydrophobic carrier compound may be determined for any given combination of substrate, water soluble vinyl monomers carrier, initiators, acids and temperature by routine testing to determine durability of retention of improved surface properties after about 20 machine washings. Such tests for a given combination should indicate whether a particular desired improvement of surface properties for the substrate, such as improved wicking, hand, soil release, or antistatic properties, is retained by the substrate. The system is agitated for a sufficient period of time for dispersal and contact of the components with the substrate prior to addition of water-soluble cross-linking vinyl monomer. A period of time of between about 30 seconds to 30 minutes may be used. Routine testing may be used to determine a satisfactory time period.

The system is preferably maintained under agitation throughout the process. Such agitation will result in better emulsification and dispersal of the hydrophobic carrier compound, so that a suitable emulsion thereof is obtained.

Acid and water-soluble cross-linking vinyl monomer are then added to complete the aqueous mixture. The monomer is present in a concentration between preferably about 0.002 and about 10 weight percent on weight of the substrate. The concentration of the monomer is normally not critical in terms of a desirable product, and may be varied. Upper and lower limits may be readily determined by routine testing for improved surface properties of the substrate. With some emulsifiers, it may be necessary to remove the substrate from the treatment bath, rinse out excess emulsifier, and re-immerse the emulsion-laden substrate in a fresh water bath prior to addition of the water-soluble cross-linking monomer and acid in order to achieve optimal results.

The weight percentage concentration of the acid will depend upon the nature of the acid. This is readily determinable by simple tests within the skill of one having ordinary skill in the art. By way of example, suitable concentrations for hydrochloric acid are such that a pH between about 2.5 and about 4.0 is achieved in the aqueous mixture. At a pH of 2 or below, a spontaneous free radical polymerization may take place. Such a higher acid concentration effect is known to the art. Initiator is then added to the aqueous mixture in an amount sufficient to initiate polymerization of the cross-linking vinyl monomer.

The particular concentrations of the water-soluble cross-linking vinyl monomer, carrier compound, acid and the initiator in the treatment system will vary widely depending upon such factors as the nature of the particular components, the time and temperature of the treatment, and the nature and form of the substrate being treated. While certain concentrations, acids, and initiators may be needed under a given set of treatment conditions, Applicants cannot give general ranges which would apply to all monomers, carrier compounds, acids and initiators under all conditions, but those of ordinary skill in the art will be able to optimize the concentrations by routine experimentation on the basis of the present disclosure.

Attaining the desired degree of treatment according to this invention depends on the strength of the initiator, or the concentration of the water-soluble monomer and carrier compound, and on the pH. Thus, for example, a strong initiator, as for example a free radical initiator that forms relatively high concentrations of free radicals and/or a high weight concentration of initiator, could require a lower concentration of water soluble vinyl monomer. Conversely, a weak initiator, that is, an initiator which creates active initiating free radicals at a slower rate than a strong initiator under given polymerization conditions, would require a higher monomer concentration. The treatment according to this invention can be controlled by draining the initiator-containing solution from the fabric once the desired extent of polymerization has been achieved.

The rate of polymerization is a function of the concentration of acid, water-soluble cross-linking vinyl monomer, carrier, substrate, and initiator. It is also a function of temperature and type of equipment being used. The substrate is allowed to remain in the treating solution at a temperature high enough and for a period of time long enough to assure that uniform polymerization ("substantial polymerization") has occurred, such time usually being between about 30 seconds and about 30 minutes. The fibers can then be rinsed with water to remove excess homopolymers, if any.

When treating substrates other than fabrics or fibers the apparatus employed will be selected to provide adequate contact between the substrate and the treating solution. Where the substrate is clean, the washing or scouring step may be omitted. Further, the process may be processed on a continuous basis by the sequential introduction of the articles to be treated into baths containing the carrier compound and water-soluble vinyl monomer either in a single bath or sequentially and then subsequently introducing the substrate into a bath containing the polymerization initiator which is maintained at a suitable temperature.

VERTICAL WICKING TEST

Vertical wicking of substrates treated according to the present invention was determined by the following procedure. A piece of fabric measuring 1×6 inches was cut from fabric treated according to the present invention. A nonindelible ink line was drawn vertically through the middle of the fabric such that the path of absorbed water was more visible. The fabric was held vertically and immersed to a depth of ½ inch in a 200 milliliter beaker containing 150 milliliters of water. After one minute of elapsed time, the distance of vertical absorption was measured.

The invention will now be described in greater detail by reference to the following specific, non-limiting examples:

EXAMPLES 1-6

A twenty gram scoured fabric sample made of one hundred denier, thirty-three filament, texturized polyester with a fabric density of 110.3 grams per square meter was immersed in 750 milliliters of 60° C. tap water in a 1,000 ml glass beaker that contained 0.9 grams of a solution containing 33% NP-10 and 67% of a hydrophobic carrier compound from Table I. The beaker further contained seven drops of concentrated hydrochloric acid (pH of medium being about 3). NP-10 is a nonionic surfactant produced by Union Carbide Corporation of Old Ridgebury Road, Danbury, Conn under the trademark "TERGITOL NP-10". It is a nonylphenol polyethylene glycol ether having the emperical formula $C_{36}H_{66}O_{10}$ and the CAS name of poly(oxy-1,2-ethanediyl), alpha-(4-nonylphenyl)-omega-hydroxy-. The treatment mixture was then heated to 95° C. (plus or minus 3° C.) in fifteen minutes on a hot plate. The fabric was removed from the bath, cooled and rinsed to remove excess NP-10. The fabric was then immersed in a fresh bath of 750 milliliters of 60° C. tap water in a 1,000 ml glass beaker. After adding seven drops of concentrated hydrochloric acid to bring a pH of the solution approximately 3, the solution was heated to 70° C., at which temperature 0.2 grams of N,N'-methlyenebisacrylamide (MBA) was stirred into solution. The temperature was gradually increased to 90° C. at which point 0.1 grams potassium persulfate was added and the vinyl monomer was given twenty minutes to polymerize and react onto the fabric. The treated fabric was then rinsed in cold water and washed fifty cycles in a home laundry machine with a 69:1 bath ratio, 57 C ten-minute wash cycle, warm rinse cycle, and 2.0% on weight of goods of Tide home laundry detergent. Detergent was then rinsed out of the samples. Wicking was determined according to the Vertical Wicking Test, above. The results are set forth in Table II.

TABLE I

| Example | Hydrophobic Carrier Compound |
| --- | --- |
| 1. | Bis(diethyleneglycol) terephthalate |

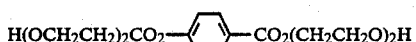

| 2. | Diethoxylated Bisphenol A |
| --- | --- |

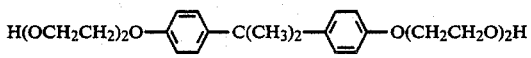

| 3. | Triethoxylated Bisphenol A |
| --- | --- |

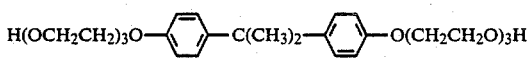

| 4. | Ethoxylated Bisphenol A bisisobutyrate |
| --- | --- |

TABLE I-continued

| Example | Hydrophobic Carrier Compound |
|---|---|
| | $(CH_3)_2CHCO_2CH_2CH_2O$—⟨phenyl⟩—$C(CH_3)_2$—⟨phenyl⟩—$OCH_2CH_2O_2CCH(CH_3)_2$ |
| 5. | Dow Epoxy Resin 331 |
| | $CH_2CHCH_2$—$[O$—⟨phenyl⟩—$C(CH_3)_2$—⟨phenyl⟩—$OCH_2CH(OH)CH_2]_nO$—⟨phenyl⟩—$C(CH_3)_2$—⟨phenyl⟩—$OCH_2CH$—$CH_2$ (epoxide terminals) |
| 6. | 1,4-butanediol diglycidyl ether |
| | $CH_2CHCH_2O(CH_2)_4OCH_2CH$—$CH_2$ (epoxide terminals) |
| 7. | Ethoxylated bisphenol A dimethacrylate (comparative) |
| | $CH_2{=}C(CH_3)CO_2CH_2CH_2O$—⟨phenyl⟩—$C(CH_3)_2$—⟨phenyl⟩—$OCH_2CH_2O_2C(CH_3)C{=}CH_2$ |
| 8. | Untreated control |

TABLE II

| | VERTICAL WICKING (INCHES) NUMBER OF WASHES | | | | | | | | |
|---|---|---|---|---|---|---|---|---|---|
| Example | 0 | 6 | 12 | 18 | 24 | 30 | 36 | 42 | 48 |
| 1 | 2.50 | 1.50 | 1.63 | 1.50 | 1.75 | 2.00 | 1.50 | 1.38 | 1.00 |
| 2 | 2.38 | 1.75 | 1.63 | 1.75 | 1.75 | 2.00 | 1.63 | 1.25 | 1.00 |
| 3 | 2.50 | 1.75 | 1.75 | 1.50 | 1.50 | 1.63 | 1.50 | 1.13 | 1.00 |
| 4 | 2.25 | 1.50 | 1.50 | 1.13 | 1.25 | 1.25 | 1.25 | 1.25 | 1.25 |
| 5 | 2.50 | 2.00 | 2.00 | 1.75 | 1.50 | 1.75 | 1.75 | 1.50 | 1.50 |
| 6 | 2.50 | 2.25 | 2.25 | 1.75 | 1.63 | 1.25 | 1.25 | 1.25 | 1.25 |
| 7 | 2.75 | 2.50 | 2.50 | 2.50 | 2.38 | 2.50 | 2.25 | 2.25 | 2.38 |
| 8 | 0 | 0 | 0 | 0 | 0 | 0 | 0 | 0 | 0 |

It is apparent from the above that although the degree and permanency of wicking is less than that for the cross-linking vinyl monomer ethoxylated Bisphenol A dimethacrylate (comparative Example 7), representative non-vinyl molecules may be suitably employed as carrier compounds according to the present process. Moreover, it is clear from Examples 1-4 that the carrier compound need not even be polymerizable to achieve improvement in hygroscopicity over the control (Example 8).

Polyester fabric was scoured, and treated in accordance with the following procedure.

Prescour

A ten pound (±5%) fabric sample made of one hundred denier, thirty-three filament, texturized polyester with a fabric density of about 110.3 grams per square meter was placed in a steam-heated Smith Drum rotary dye tub (10 pound rated fabric capacity) filled with 96 liters of warm (100° F.-120° F.; 37.8° C.-48.9° C.) tap water. About 11 g of Tergitol NP-10 was added to the water and the drum was switched on for the balance of this Prescour step. Over the course of 5 minutes, the bath was heated to about 180° F. (82.2° C.), and maintained at 180° F. for about 10 minutes further. The drum was switched off, the tub was drained, and the fabric was rinsed according to the following standard rinsing procedure.

The drum was switched on and the tub was filled with warm (100° F.-120° F.) overflowing water. After 5 minutes, the drum was switched off and the tub was drained, and re-filled with warm tap water. The drum was then reactivated for 5 minutes after which the tub was drained again. This rinsing procedure was repeated until the rinse water was clear.

Pretreatment

The tub was filled with warm tap water and the drum was switched on. About 35 ml of industrial grade concentrated (33%) hydrochloric acid was added to the tub water to give a bath pH of about 3 according to universal pH paper. About 45 g of a solution containing by weight 60% of a hydrophobic carrier compound from Table I and 40% ethoxylated nonylphenol (NP-10) was added to the bath thereby forming an emulsion. The temperature was then increased to about 190° F. (87.8° C.) over about 5 minutes. The bath was maintained for an additional 5 minutes at this temperature. The drum was switched off and the tub was drained. The fabric was rinsed according to the standard rinse described in the Prescour step above.

Treatment

The tub was filled with warm tap water, and the drum activated. About 35 ml of industrial trade concentrated (33%) hydrochloric acid was added to the bath water to give a bath pH of about 3 according to universal pH paper. The temperature of the bath was then increased to about 140° F. (60° C.) over about 2 minutes. About 40 g of a water-soluble monomer mixture of the following composition by weight was added: 66% N,N'-methylenebisacrylamide, 10% glyoxal bisacrylamide and 24% sucrose. The temperature of the bath was then increased to 195° F. (90.6° C.) over about 5 minutes, and thereafter maintained at 195° F. for about 5 minutes. About twenty grams of potassium persulfate was then added, and the temperature was maintained at 195° F. (90.6° C.) for 10 minutes. The temperature was lowered to 160° F. (71.1° C.) by adding cold water, at which point the drum was switched off and the bath was drained.

Final Scour

The Prescour procedure was repeated as a postscour.

The home washing machine utilized in the above examples was a "Kenmore" automatic, model 110.82070120, manufactured by Sears, Roebuck and Co. Thus, references to "number of washes" or "cycles of laundering" or "cycles of laundering in a conventional home washing machine" in this specification or in the following claims pertains to laundering as performed in the aforesaid machine or a similar machine. Laundering was according to the following steps: (1) a 10 minute cycle of agitation in 55° C. tap water containing 2% "TIDE" home laundry detergent on weight of goods, (2) extraction of the wash water by spinning, (3) a warm rinse cycle with agitation, and (4) final water extraction (spin cycle).

We consider the improvement in hygroscopic properties of substrates treated according to the present invention to "persist" for 20 such washings if, after the twentieth washing, the treated substrate has retained at least some portion of its initial wetability as measured according to the procedure of the above examples.

The present invention may be embodied in other specific forms without departing from the spirit or essential attributes thereof and, accordingly, reference should be made to the appended claims, rather than to the foregoing specification, as indicating the scope of the invention.

WHAT IS CLAIMED AS NEW AND DESIRED TO BE SECURED BY LETTERS PATENT OF THE UNITED STATES IS:

1. A process for improving the surface properties of a polymer substrate comprising:
    (a) contacting the substrate with an aqueous mixture at a temperature between about 40° C. and about 100° C. containing an effective amount of a water-soluble cross-linking vinyl monomer and an effective amount of an organic hydrophobic carrier compound, all non-aromatic carbon-carbon bonds of said carrier compound being saturated; and
    (b) thereafter initiating polymerization of said water-soluble cross-linking monomer to form a vinyl polymer on the substrate whereby the surface properties of the substrate are improved.

2. A process according to claim 1 wherein the aqueous mixture is maintained under agitation in step (a).

3. A process according to claim 1 wherein the aqueous mixture is a suitable aqueous emulsion containing a water-soluble cross-linking vinyl monomer, and a hydrophobic carrier compound which is emulsifiable.

4. A process in accordance with claim 3 wherein the temperature during polymerization is between about 80° C. and about 100° C.

5. A process in accordance with claim 4 wherein the temperature during polymerization is between about 90° C. and about 95° C.

6. A process according to claim 3 wherein the carrier compound has the formula:

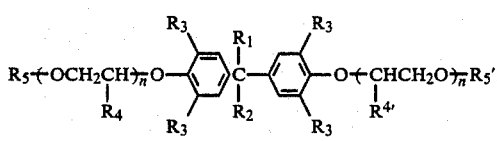

wherein
n is an integer from zero to ten;
$R_1$ and $R_2$ are independently selected from the group consisting of hydrogen and alkyl, cycloalkyl, alkylaryl and halohydrocarbyl groups containing from 1 to 20 carbon atoms;
each $R_3$ is independently hydrogen or alkyl;
$R_4$ and $R_{4'}$ are independently selected from the group consisting of hydrogen and hydrocarbyl groups containing from 1 to 20 carbon atoms; and
$R_5$ and $R_{5'}$ are independently selected from the group consisting of hydrogen, hydrocarbyl and halohydrocarbyl groups containing from 1 to 30 carbon atoms, and acyl groups containing from 1 to 30 carbon atoms.

7. A process according to claim 3 wherein the carrier compound has the formula:

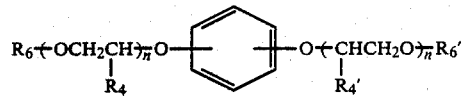

wherein
n is an integer from zero to ten;
$R_4$ and $R_{4'}$ are independently selected from the group consisting of hydrogen and hydrocarbyl groups containing from 1 to 20 carbon atoms; and
$R_6$ and $R_{6'}$ are independently selected from the group consisting of (i) hydrogen, (ii) alkyl, cycloalkyl, alkylaryl and halohydrocarbyl groups containing from 1 to 20 carbon atoms, and (iii) alkanoyl, cycloalkanoyl, arylalkanoyl and halohydrocarbanoyl groups containing from 1 to 20 carbon atoms.

8. A process according to claim 3 wherein the carrier compound has the formula:

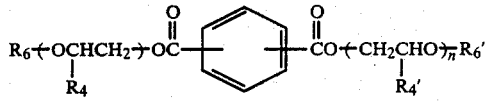

wherein
n is an integer from zero to ten;
$R_4$ and $R_{4'}$ are independently selected from the group consisting of hydrogen and hydrocarbyl groups containing from 1 to 20 carbon atoms; and
$R_6$ and $R_{6'}$ are independently selected from the group consisting of (i) hydrogen, (ii) alkyl, cycloalkyl, alkylaryl and halohydrocarbyl groups containing from 1 to 20 carbon atoms, and (iii) alkanoyl, cycloalkanoyl, arylalkanoyl, and acylhalohydrocarbanoyl groups containing from 1 to 20 carbon atoms.

9. A process according to claim 3 wherein the carrier compound has the formula:

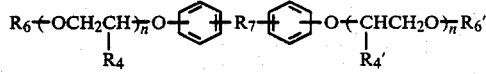

wherein
n is an integer from zero to ten;
wherein $R_4$ and $R_{4'}$ are independently selected from the group consisting of hydrogen and hydrocarbyl groups containing from 1 to 20 carbon atoms;
$R_6$ and $R_{6'}$ are independently selected from the group consisting of (i) hydrogen, (ii) alkyl, cycloalkyl, alkylaryl and halohydrocarbyl groups containing from 1 to 20 carbon atoms, and (iii) alkanoyl cycloalkanoyl, arylalkanoyl and halohydrocarbanoyl groups containing from 1 to 20 carbon atoms; and $R_7$ is selected from the group consisting of alkylene, alkylalkylene, cycloalkylene, arylalkylene, haloalkylenyl and haloalkylalkylene groups containing from 1 to 20 carbon atoms, oxygen, sulfur, $C=O$ and $-SO_2-$.

10. A process according to claim 3 wherein the carrier compound has the formula:

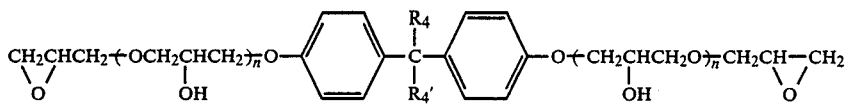

wherein
n is an integer from zero to ten; and
$R_4$ and $R_{4'}$ are independently selected from the group consisting of hydrogen and hydrocarbyl groups containing from 1 to 20 carbon atoms.

11. A process according to claim 3 wherein the carrier compound has the formula:

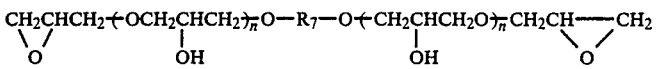

wherein
n is an integer from zero to ten; and
$R_7$ is selected from the group consisting of (i) alkylene groups containing from 1 to 20 carbon atoms, (ii) alkyl-, cycloalkyl-, aryl-, aralkyl-, halo- and haloalkyl-substituted alkylene groups of from 1 to 20 carbon atoms.

12. A process according to claim 3 wherein the carrier compound is a member of the group consisting of

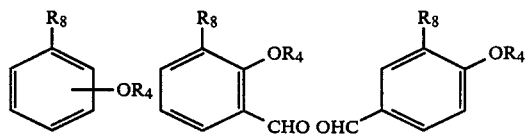

wherein
$R_4$ is selected from the group consisting of hydrogen and hydrocarbyl groups containing from 1 to 20 carbon atoms; and
$R_8$ is selected from the group consisting of hydrogen and alkyl, cycloalkyl, alkylaryl and halohydrocarbyl groups containing from 1 to 30 carbon atoms.

13. A process according to claim 3 wherein the suitable emulsion contains an emulsifying agent of a composition which does not adversely interfere with the process and which is present in an amount sufficient to maintain said suitable aqueous emulsion but not enough to adversely interfere with said process.

14. A process in accordance with claim 13 wherein step (a) comprises the steps of:
(i) immersing the substrate in water;
(ii) adding the hydrophobic carrier compound and emulsifying agent to the water to form an aqueous emulsion of the hydrophobic carrier compound;
(iii) agitating the system for a sufficient time for dispersal and contact of the components to occur; and
(iv) adding water soluble vinyl monomer.

15. A process in accordance with claim 14 wherein the substrate is rinsed after step (iii) to remove excess emulsifying agent.

16. A process according to claim 11 wherein the improvement in the surface properties of the substrate persists for at least 20 cycles of laundering in a conventional home washing machine.

17. A process in accordance with claim 16 in which the initiation of polymerization in step (b) is achieved by a chemical initiator.

18. A process in accordance with claim 16 in which the initiation of polymerization in step (b) is achieved by a physical impetus which starts and maintains polymerization.

19. A process in accordance with claim 16 wherein the suitable aqueous emulsion in step (a) is maintained below the polymerization temperature and contains an initiator which is activated by raising the temperature above the polymerization temperature in step (b).

20. A process in accordance with claim 16 in which the water-soluble cross-linking vinyl monomer is present in a concentration of between about 0.002 to 10 weight percent on weight of the substrate.

21. A process in accordance with claim 16 in which the hydrophobic carrier compound is present in the suitable aqueous emulsion in a concentration of between about 0.02 to 2.0 weight percent on weight of the substrate.

22. A process in accordance with claim 16 in which the suitable aqueous emulsion is in contact with the substrate for at least about 30 seconds to 30 minutes prior to initiating polymerization.

23. A process in accordance with claim 16 in which polymerization is achieved within about 30 seconds to about 30 minutes after initiation in step (b).

24. A process in accordance with claim 16 wherein the carrier compound is selected from the group consisting of 5-hydroxy-3-oxapentyl terephtalate, diethoxylated Bisphenol A, triethoxylated Bisphenol A, hexaethoxylated Bisphenol A, isobutyric acid ester of ethoxylated Bisphenol A, and 1,4-butanediol diglycidyl ether.

25. A process in accordance with claim 16 wherein the carrier compound is an epoxy resin of the formula

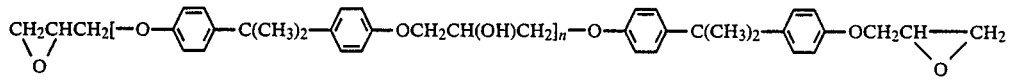

wherein n is an integer from zero to ten.

26. A process according to claim 24 or 25 wherein the water-soluble cross-linking vinyl monomer is N,N'-methylenebisacrylamide.

27. A process in accordance with claim 16 in which the hydrophobic carrier compound is present in the suitable aqueous emulsion in a concentration of between about 0.02 to 2.0 weight percent on weight of the substrate.

28. A process in accordance with claim 16 in which the concentration of the water-soluble cross-linking vinyl monomer in the suitable substrate is between about 0.002 and about 10 weight percent on weight of the substrate, the concentration of the hydrophobic carrier compound is between about 0.02 and about 2.0 weight precent on weight of the substrate, the suitable aqueous emulsion is in contact with the substrate for about 30 seconds to about 30 minutes prior to initiating polymerization and the polymerization is achieved within about 30 seconds to about 30 minutes after initiation.

29. A process according to claim 28 wherein the water-soluble cross-linking vinyl monomer is N,N'-methylenebisacrylamide and the hydrophobic carrier compound is isobutyric acid ester of ethoxylated Bisphenol A.

30. A process for improving the hygroscopic, dyereceptive and other surface properties of a polymer substrate comprising:
    (a) contacting the substrate with an effective amount of an aqueous emulsion of an organic hydrophobic carrier compound at a temperature between about 40° C. and about 100° C., all nonaromatic carbon-carbon bonds of said carrier compound being saturated;
    (b) adding an effective amount of a water-soluble cross-linking vinyl monomer to the emulsion;
    (c) initiating polymerization of said water soluble vinyl monomer to form a vinyl polymer on the substrate whereby the improvement in surface properties of the substrate persists for at least 20 cycles of laundering in a conventional home washing machine.

31. A process according to claim 30 wherein the monomer is N,N'-methylenebisacrylamide.

32. A process according to claim 30 wherein the emulsion in step (a) is maintained below the polymerization temperature and contains an initiator which is activated by raising the temperature above the polymerization temperature in step (c).

33. A process according to claim 30 wherein the temperature during polymerization is between about 90° C. and 95° C.

34. A process according to claim 30 wherein the emulsion is in contact with the substrate from about 30 seconds to about 30 minutes prior to step (c).

35. A process for improving the hygroscopic, dye-receptive and other surface properties of a polymer substrate comprising:
    (a) contacting the substrate under agitation with an effective amount of an aqueous emulsion of an organic hydrophobic carrier compound, all non-aromatic carbon-carbon bonds of said carrier compound being saturated;
    (b) rinsing the substrate to remove excess emulsifying agents from the substrate;
    (c) contacting the emulsion-laden substrate with an effective amount of an aqueous solution of a water-soluble cross-linking vinyl monomer at a temperature between about 40° C. and about 100° C.; and
    (d) initiating polymerization of said monomer to form a vinyl polymer of the substrate whereby the hygroscopic, soil release and other surface properties of the substrate are improved.

36. A process according to claim 35 wherein the water-soluble cross-linking vinyl monomer is N,N'-methylenebisacrylamide.

37. A process according to claim 35 wherein the temperature during step (a) is between about 40° C. and about 100° C.

38. A process according to claim 35 wherein the temperature during polymerization is between about 80° C. and about 100° C.

39. A process according to claim 38 wherein the temperature during polymerization is between about 90° C. and about 95° C.

40. A process according to claims 1, 3, 14, 16, 30 or 35 wherein the substrate is polyester.

41. A process according to any of claims 1, 3, 14, 16, 30 or 35 wherein the substrate is a polyolefin.

42. A process according to claim 38 wherein the polyolefin is polypropylene.

43. A process according to any of claims 1, 3, 14, 16, 30 or 35 wherein the substrate is a polyamide.

44. A process according to claim 43 wherein the polyamide is selected from the group consisting of nylon 6 and nylon 6,6.

45. A process according to any of claims 1, 3, 14, 16, 30 or 35 wherein the substrate is an acrylic.

46. The process according to any of claims 1, 3, 14 or 35 wherein the substrate is polystyrene.

* * * * *